United States Patent [19]

Gentinetta et al.

[11] Patent Number: 5,778,538
[45] Date of Patent: Jul. 14, 1998

[54] HAND POWER TOOL WITH ADJUSTABLE FOOT PLATE

[75] Inventors: René Gentinetta; Beat Kaech; Robert Simm, all of Zuchwil, Switzerland

[73] Assignee: Scintilla AG, Solothurn, Switzerland

[21] Appl. No.: 561,134

[22] Filed: Nov. 20, 1995

Related U.S. Application Data

[63] Continuation of Ser. No. 164,265, Dec. 9, 1993, abandoned.

[30] Foreign Application Priority Data

Dec. 24, 1992 [DE] Germany ............... 42 44 079.3

[51] Int. Cl.⁶ .................. B23D 51/02; B27B 19/02
[52] U.S. Cl. .................. 30/124; 30/376; 30/392
[58] Field of Search ............... 30/124, 133, 374, 30/375, 376, 377, 392, 393, 394

[56] References Cited

U.S. PATENT DOCUMENTS

| | | | |
|---|---|---|---|
| 3,087,519 | 4/1963 | McCarty et al. | 30/376 |
| 3,131,736 | 5/1964 | Ristow et al. | 30/376 |
| 3,146,809 | 9/1964 | Botefuhr | 30/376 |
| 3,383,973 | 5/1968 | Gazal | 411/1 |
| 3,942,251 | 3/1976 | Griffies et al. | 30/376 |
| 4,090,297 | 5/1978 | Wanner et al. | 30/374 X |
| 4,512,697 | 4/1985 | Cascini | 411/7 |
| 4,730,397 | 3/1988 | Weiford et al. | 30/392 |
| 4,837,935 | 6/1989 | Maier et al. | 30/392 |
| 5,012,583 | 5/1991 | Blochle et al. | 30/392 |

FOREIGN PATENT DOCUMENTS

| | | | |
|---|---|---|---|
| 396540 | 12/1992 | European Pat. Off. | |
| 603352 | 6/1994 | European Pat. Off. | 30/376 |
| 2435845 | 2/1976 | Germany | 30/376 |
| 622871 | 7/1961 | Italy | 30/374 |

*Primary Examiner*—Rinaldi I. Rada
*Assistant Examiner*—Clark F. Dexter
*Attorney, Agent, or Firm*—Michael J. Striker

[57] ABSTRACT

A hand power tool comprises a motor housing, a foot plate adjustably arranged on the motor housing, a chip removing tool, a suction device for aspirating chips and dust and provided in a space between the motor housing and the foot plate, a clamping device adjustably mounting the foot plate on the housing and an outwardly accessible handle. The clamping device is connected with the outwardly accessible handle by force reducing actuating members which include an overrunning coupling.

3 Claims, 3 Drawing Sheets

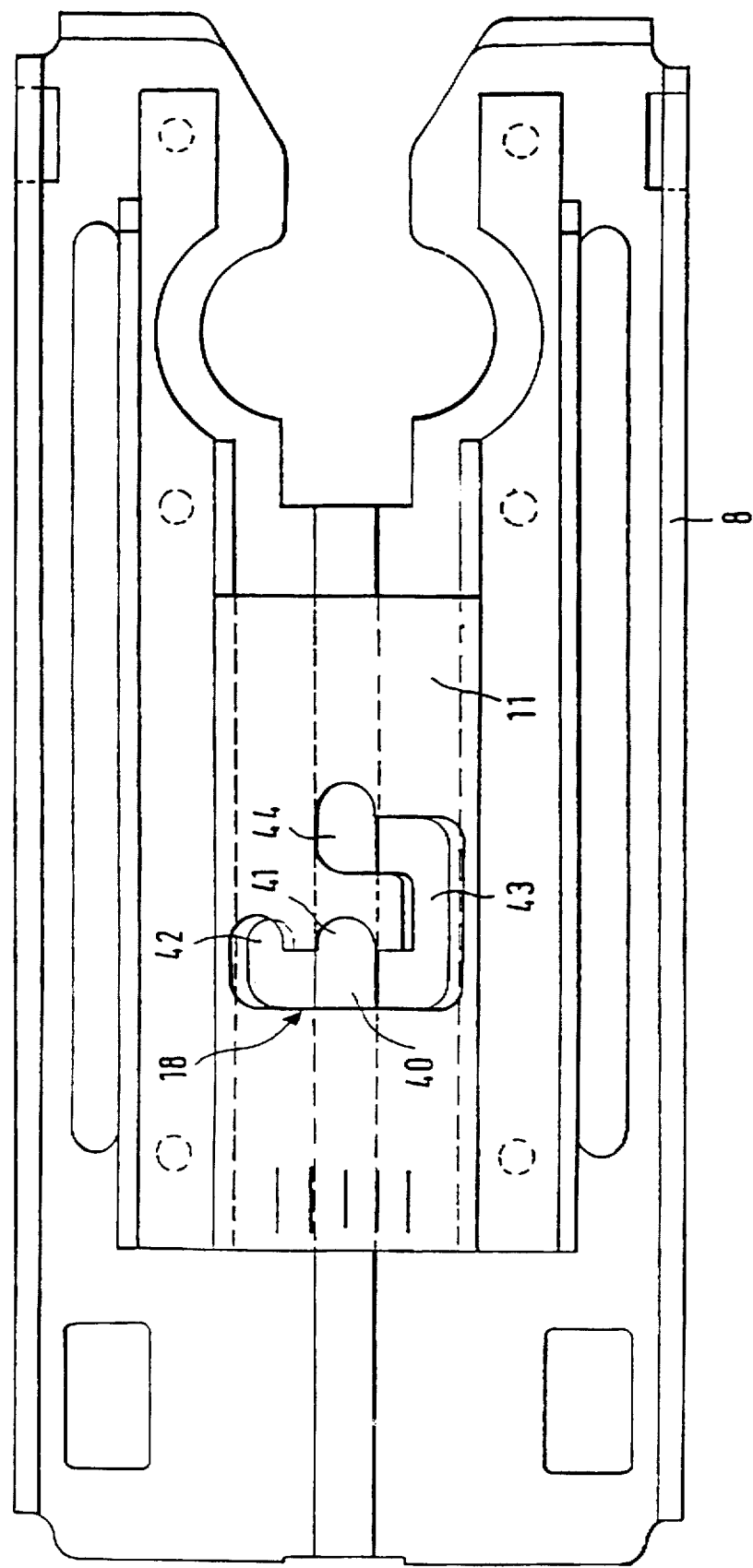

HAND POWER TOOL WITH ADJUSTABLE FOOT PLATE

This is a continuation, of application Ser. No. 08/164,265 filed Dec. 9, 1993, now abandoned.

BACKGROUND OF THE INVENTION

The present invention relates to a hand power tool.

More particularly, it relates to a hand power tool with a motor housing, a foot plate adjustably arranged in the motor housing, and a chip-removing tool having a suction device between the motor housing and the foot plate.

Hand power tools of the above mentioned general type are known in the art. One of such hand power tools is disclosed for example in the patent document WO 88/07906 (EP 396 540). This document discloses a compass saw which is provided with a clamping device having a screw gear for clamping the foot plate. The required clamping force can be applied however only manually through a screw gear when its outer diameter is selected to be very great. A great diameter of the screw gear is however contrary to a turning of the foot plate for miter-box saws. First only low miter angles can be adjusted in this situation. In addition, in this case the screw wheel is accessible only from one side and in another words to a limited extent.

SUMMARY OF THE INVENTION

Accordingly, it is an object of the present invention to provide a hand power tool which avoids the disadvantages of the prior art.

In keeping with these objects and with others which will become apparent hereinafter, one feature of the present invention resides, briefly stated, in a hand power tool in which the clamping device is connected with a knob accessible from outside through reducing actuating members.

When the hand power tool is designed in accordance with the present invention, the releasing and fixing of the foot plate can be performed manually in a convenient way without auxiliary means of the tool. Simultaneously the hollow space between the foot plate bottom and the motor housing remains free for a suction device. In particular, no through-going openings for handling the clamping device are needed.

It is especially advantageous when an overriding coupling which limits the transmittable torque is provided between the clamping device and the knob. For manually releasing the clamping device in any case, the overriding coupling is formed preferably asymmetrically so that in a releasing direction a greater moment is to be transmitted than during tightening of the clamping device.

It is especially advantageous for a manual operation when the construction of the knob is such that it is formed as a rotary knob on a freely accessible housing surface, especially on the rear side which is remote from the tool.

The arrangement of the axis of the rotary knob perpendicular to the upper surface of the housing has the advantage that the knob remains always freely accessible.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 4 is a plan view of the foot plate of the inventive hand power tool.

DESCRIPTION OF THE PREFERRED EMBODIMENTS

Figure 1:
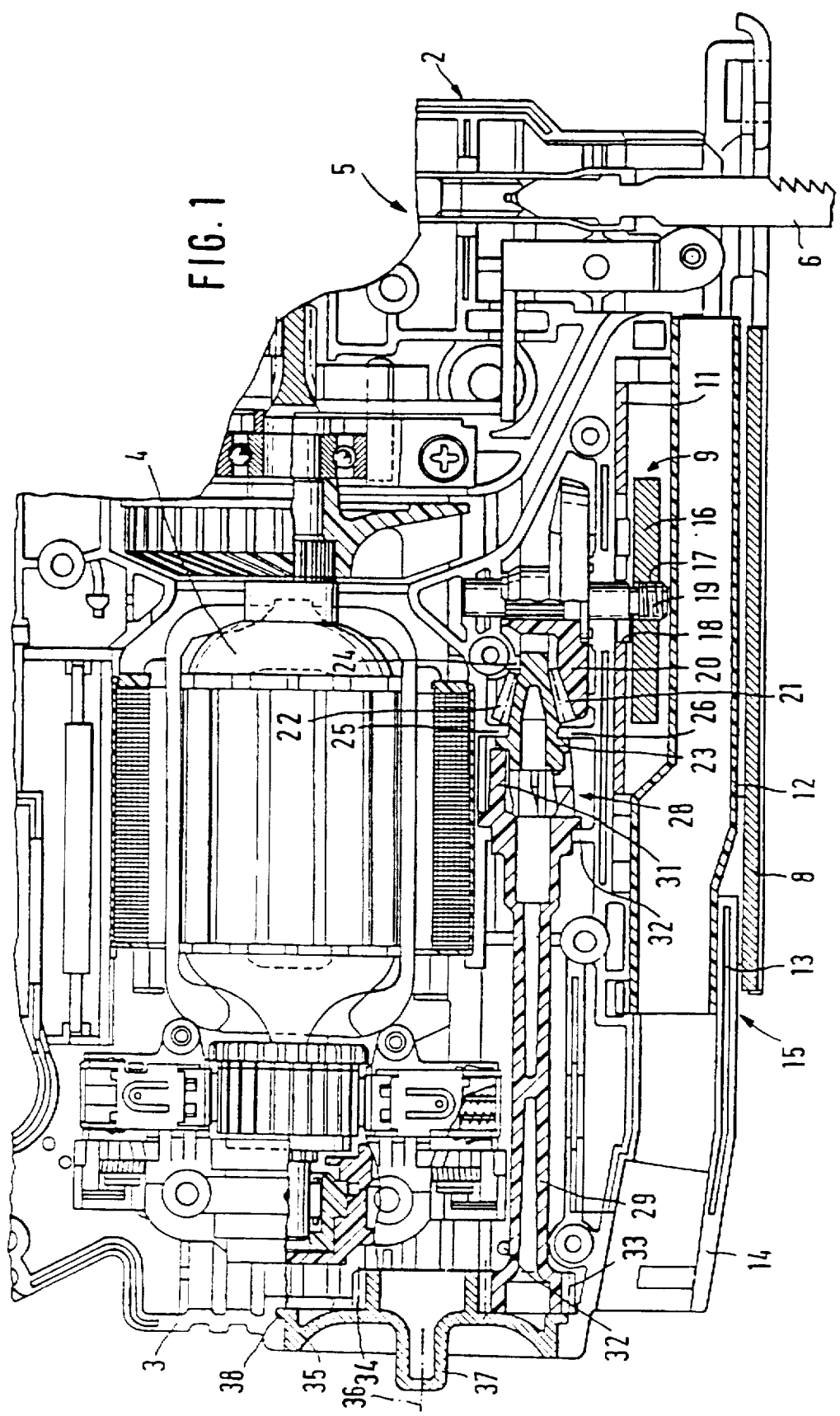
FIG. 1 is a view showing a longitudinal section of a hand power tool formed as a compass saw in accordance with the present invention.

A hand power tool in accordance with the present invention is illustrated as a compass saw and has a motor housing 2 composed of two shells. Only one housing shell 3 is shown in FIG. 1. A motor 4 and transmission parts 5 for driving a forwardly located chip removing tool formed as a saw blade 6 are inserted in the housing shell. A not shown handle is formed on the motor housing 2.

A foot plate 8 is mounted under the motor housing 2 by a clamping device 9. The foot plate 8 has a substantially flat bottom 10 for applying on a workpiece. A hollow supporting bracket 11 with a semi-cylindrically curved surface provided for the motor housing 2 is connected with the bottom 10. A suction pipe 12 which is preferably composed of synthetic plastic material is inserted in the supporting bracket 11. The suction pipe 12 opens forwardly shortly behind the saw blade 6 and is inserted with its rear end into a pipe 13 of the motor housing 2. The motor housing 2 at an extension of the pipe 13 has an insertion opening 14 for inserting a not shown suction hose connectable with a suction impeller. The parts 12, 13, 14 together form a suction device 15 for removing chips produced during sawing.

The clamping device 9 has a clamping plate 16 which is located inside the supporting bracket 11 and has a thread 17. A screw part of a disc wheel 20 which extends through an opening 18 in the supporting bracket 11 engages with the thread 17. The screw part 19 is formed as a metal axle 19 and supported above and below the disc wheel 20 in the motor housing 2. The disc wheel 20 is composed of synthetic plastic and injection molded on the axle 19. Instead of the screw part 19, selectively a threaded part of the clamping plate 16 can extend through the opening 18.

The disc wheel carries a bevel toothing 21 which engages with a bevel toothing 22 of a pinion 23. The bevel toothing ratios 21-22 are selected so that a reduction ratio constitutes substantially 4:1 between the disc wheel 20 and the pinion 23. The elements 21 and 22 therefore form actuating members which provide the reduction ratio. The axis of the pinion 23 is perpendicular to the axle 19 of the disc wheel 20. The pinion 23 is held by webs 24, 25, 26 in the motor housing 2.

Figure 3:
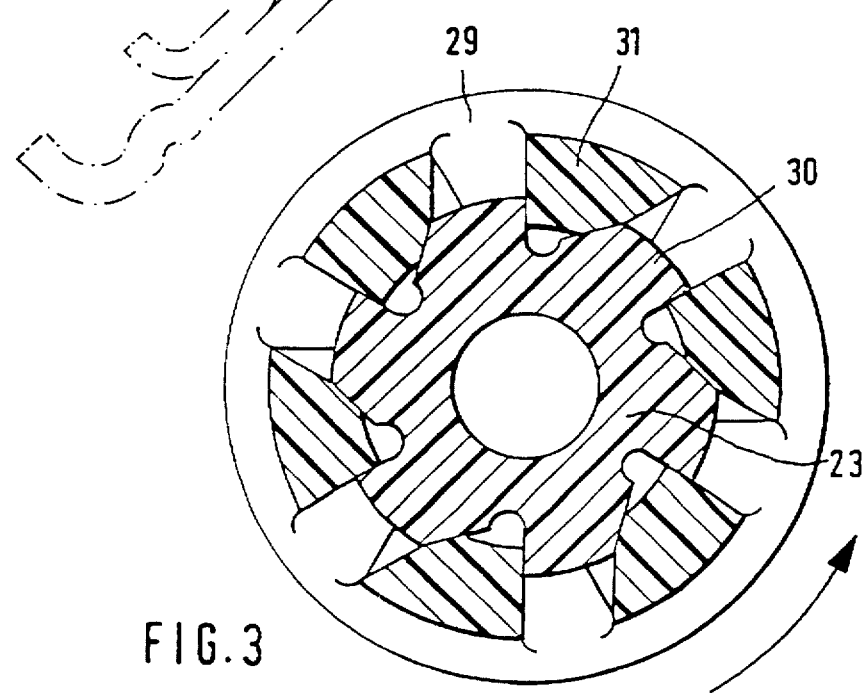
FIG. 3 is a view showing a transverse section through an overriding coupling of the inventive power tool taken according to line III—III in FIG. 1.

The actuating element for tightening and loosening of the clamping device 9 includes an overrunning coupling 28, whichin the shown embodiment is arranged between the pinion 23 and a shaft-shaped transmitting member 29. For this purpose the pinion 23 has asymmetrical cams 30 at its end which is opposite to the bevel toothing 22. The flank angles of the cams 30 are selected so that the flank, which is loaded during opening by moving the transmitting member 29 in the direction of the arrow, is steep. In particular it is formed substantially radially, while the flank which is loaded during tightening of the clamping device 9, is flatter, for example is formed tangentially to a radius through the cam bottom. Springy elastic arresting members 31 engage in the cams 30 and have the shape of the teeth intermediate spaces between the cams 30 as can be seen in FIG. 3. The arresting members 31 are formed crown-shaped at the front end of the shaft-shaped transmitting member 29.

The transmitting member 29 is supported in the motor housing on webs 32, similarly to the pinion 23. At the rear end it carries a spur gear 33 which engages in an outer toothing 34 of a rotary knob 35. The reduction ratio of the toothings 33–34 amounts to substantially 0.4:1. Therefore the elements 33–34 form additional actuating members which provide the reduction ratio. The rotary knob 35 operates as a manual knob and has a web 37 extending along its diametrical line through the axis 36. The rotary knob 35 is inserted in the housing shell 3 and held there over its periphery. For securing against falling out, the rotary knob has a radially projecting collar 38.

The opening 18 in the supporting bracket 11 is shown in FIG. 4. It has a composite shape providing first a slot 40 which extends transversely to the longitudinal direction of the foot plate 8. The slot is provided in its center with a depression 41 in which the screw part 19 extends during straight cutting without miter. At the end of the slot 40 laterally a further depression 42 is provided for the miter cut under 45°. This position of the foot plate is shown in a broken line in FIG. 2. In the slot 40, each further angular position for the miter cut is adjustable between 0° and 45°, selectively, to the right and to the left. A passage 43 extends perpendicularly at the end of slot 40 which is opposite to the depression 42. The passage 43 merges into a second slot 44. The second slot serves for sawing which is close to the edge. When the screw part 19 is located in the slot 44, the foot plate 8 is offset rearwardly relative to the motor housing 2. The construction of the passage 18 is such that the foot plate 8 can be fixed in each desired position without removal of the screw part 19 from the passage 18.

The foot plate 8 with the suction device 15, the clamping device 9 and the actuating elements 23, 29 and 35 is inserted in a premounted condition in the housing shell 3. By placing the second housing shell 3a shown in FIG. 2, all parts are fixed in their position. The foot plate 8 after mounting to the compass saw is no longer removable, but instead is releasable only for turning.

For adjusting a miter angle, the foot plate 8 is released relative to the motor housing 2 by counterclockwise rotation on the rotary knob 35 only until it is turnable. Then the foot plate 8 can be rotated to a certain degree around the suction pipe 12. By the clockwise rotation of the knob 35 the foot plate is again fixed. When the predetermined tightening moment is obtained, the elastic arresting members 31 of the transmitting member 29 are pressed outwardly over the flat flank of the cam 30 of the pinion 23 and overrun; the pinion 23 remains removable. The possible releasing moment is substantially higher than the tightening moment, since the loaded flanks of the cam 30 are formed in this case radially.

Figure 2:
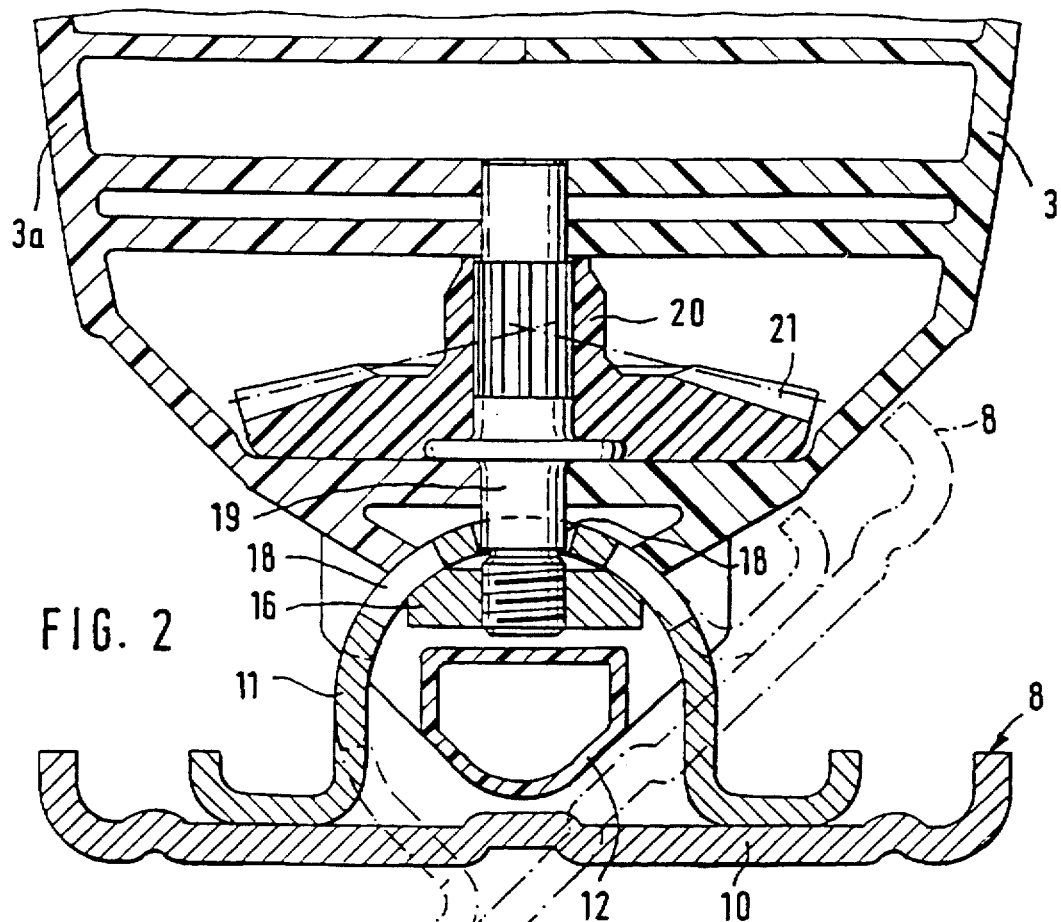
FIG. 2 is a view showing a section taken at the height of a clamping device according to line II—II in FIG. 1.

The maximum adjustable miter angle amounts to approximately 45°, as shown in FIG. 2 in a broken line. The required clamping force for a reliable fixing of the foot plate also during rough saw operation can be easily applied by hand due to a reduction ratio of approximately 4:1 to 8:1 of the actuating elements.

It will be understood that each of the elements described above, or two or more together, may also find a useful application in other types of constructions differing from the types described above.

While the invention has been illustrated and described as embodied in a hand power tool, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims:

1. A hand power tool comprising, a motor housing;
   a foot plate adjustably arranged on said motor housing; a chip removing tool movably supported in said housing; a suction device for aspirating chips and dust and provided in a space between said motor housing and said foot plate; a clamping device adjustably mounting said foot plate on said housing; and a knob accessible outwardly of said housing said clamping device being connected to said knob by actuating members, said actuating members being connected to one another by an overrunning coupling for limiting a moment transmitted from the knob to said clamping device, one of said actuating members being a pinion, and said overrunning coupling including asymmetrical cams on said pinion, wherein each of said asymmetrical cams have two generally radially extending flanks extending at different flank angles, said overrunning coupling further including springy arresting members on another of said actuating members and cooperating with said asymmetrical cams of said pinion, said pinion being further provided with toothing, said clamping device having a disc wheel with which said toothing engages.

2. A hand power tool as defined in claim 1, wherein said toothing is formed as a bevel toothing.

3. A hand power tool comprising; a motor housing; a foot plate adjustably arranged on said motor housing; a chip removing tool movably supported in said housing; a suction device for aspirating chips and dust and provided in a space between said motor housing and said foot plate; a clamping device adjustably mounting said foot plate on said housing said clamping device including a clamping plate, a screw part and a disc wheel, wherein said clamping plate presses said foot plate against said housing and is provided with a threaded portion, said screw part engaging with said threaded portion, and said disc wheel mounted on said screw part for rotation therewith; a bevel toothed member operably engaging with said disc wheel, a shaft member which is connected with said bevel toothed member through an overrunning coupling for limiting a moment transmitted from said shaft member to said bevel toothed member, said shaft member having a rear end carrying a spur gear, and a rotary knob engaging with said spur gear and actuatable by hand.

* * * * *